July 27, 1948.  A. P. LANTZ  2,445,956
BUILT-IN IRONING BOARD

Filed Aug. 8, 1944  9 Sheets-Sheet 1

Inventor
ALPHA PERRY LANTZ.
Attorneys

July 27, 1948.                    A. P. LANTZ                    2,445,956
                              BUILT-IN IRONING BOARD Filed Aug. 8, 1944                                           9 Sheets-Sheet 3

Inventor
ALPHA PERRY LANTZ
By
Attorneys

July 27, 1948. A. P. LANTZ 2,445,956
BUILT-IN IRONING BOARD
Filed Aug. 8, 1944 9 Sheets-Sheet 4

Inventor
ALPHA PERRY LANTZ.

July 27, 1948.　　　　A. P. LANTZ　　　　2,445,956
BUILT-IN IRONING BOARD
Filed Aug. 8, 1944　　　　　　　　　　　9 Sheets-Sheet 5

Inventor
ALPHA PERRY LANTZ
By *Milans & Milans*
Attorneys

July 27, 1948.　　　　　A. P. LANTZ　　　　　2,445,956
BUILT-IN IRONING BOARD

Filed Aug. 8, 1944　　　　　　　　　　　　　9 Sheets-Sheet 6

Inventor
ALPHA PERRY LANTZ.

July 27, 1948.  A. P. LANTZ  2,445,956
BUILT-IN IRONING BOARD
Filed Aug. 8, 1944  9 Sheets-Sheet 7

Inventor
ALPHA PERRY LANTZ
Attorneys

July 27, 1948. A. P. LANTZ 2,445,956
BUILT-IN IRONING BOARD
Filed Aug. 8, 1944 9 Sheets-Sheet 8

Inventor
ALPHA PERRY LANTZ.
By
Attorneys

July 27, 1948. A. P. LANTZ 2,445,956
BUILT-IN IRONING BOARD
Filed Aug. 8, 1944 9 Sheets-Sheet 9

Inventor
ALPHA PERRY LANTZ.

Attorneys

Patented July 27, 1948

2,445,956

UNITED STATES PATENT OFFICE 2,445,956

BUILT-IN IRONING BOARD

Alpha Perry Lantz, Washington, D. C.

Application August 8, 1944, Serial No. 548,523

12 Claims. (Cl. 38—105)

This invention relates to a built-in ironing board, combined as a part of a customary article of furniture.

The object of the invention is to provide, in connection with an article of furniture, an ironing board that can be normally concealed within the furniture to save marring the appearance of the latter, and which may be readily projected or withdrawn therefrom to an operable position, and there firmly supported and braced to render its expected service.

The advantage flowing from such a combined piece of furniture is that the latter, taking up substantially no more than the usual space of the article itself, devoid of the attachment, may serve all of its normal purposes, and will also house the additional element of the ironing board under conditions for immediate use when desired or necessary.

The combination lends itself to the overcoming of the many extraordinary disadvantages existing at the present time created by crowded conditions, necessitating the economizing of space for living quarters, accommodations in hotels, and unavailability of adequate laundry service. However, the combination will find a convenient and satisfactory field of service at any time under ordinary conditions, in that the ironing board will be normally housed and out of sight, but at hand when needed.

With the foregoing considerations in mind, a purpose of the invention may be said to comprise the furnishing of an inexpensive but highly useful equipment or appurtenance to the furnishings of quarters of large assemblages of women, or even men, brought together in training, or otherwise incident to warring conditions and in which quarters such equipment as ironing boards are not to be readily found.

The preferred embodiment of the invention, and other convenient embodiments thereof, in matter of varying detail, will be illustrated in the accompanying drawings forming part hereof, evidencing the fundamental principle or principles involved and underlying the invention.

The preferred embodiment comprises a combined article of furniture and ironing board wherein the board may be slid into or withdrawn from housed position, associated with adjustable supporting means for rendering the board substantially rigid and fixed when in projected position. It includes an under support for the board adapted to be projected and held in various positions of adjustment so that the board will be amply braced to resist the forces and strains incident to ironing clothes or fabrics on any portion of the exposed or upper surface thereof.

The whole of the mechanism, that is, including the board and the bracing or supporting means, is operatively associated with instrumentalities for automatically propelling them from the supporting article of furniture upon the simple release of latching or locking means afforded to normally retain them in housed or concealed position within the said furniture against the ejecting force of said propelling instrumentalities.

Many novel details in construction and arrangement of parts of the aforesaid preferred embodiment of the invention, as well as other embodiments thereof, will be apparent from the detailed description hereinafter contained when read in connection with the said drawings.

Referring more specifically to the drawings 20 represents a cabinet, dresser or chest of drawers constituting, in general, the customary or preferred article of furniture, in combination with which the improved ironing board feature constituting the present invention is built and serves as a permanent part of the said furniture. The top of the dresser is represented at 21 and the closed end portions thereof at 22 and 23 respectively, the one completely closing the end of the dresser and the latter closing the end thereof save for an appropriate space at the top designated 24 to accommodate the projection and insertion of the ironing board 25. The space 24 is seen perhaps best in Fig. 2 of the drawings wherein the end wall 23 is illustrated as of a graceful or arcuate upper edge and the closing panel or door is illustrated at 26, hinged at one end as at 27 to a part of the fixed framework.

Any desired embellishment or ornamental finish may be furnished the door 26 and end wall 23 to normally present a corresponding nice appearance when the ironing board is concealed and protected within the casing; and, as will be obvious, the door may be provided with a latch or lock (not shown) to maintain the same in closed condition, as desired.

The ironing board 25 may be of a length and width of approximately standard size capable of being used in any domestic ironing operation. The means for supporting and bracing the same will now be described.

The dresser is built to provide a chamber 31 over a partition 32, above the dresser and drawer spaces, as shown, and preferably laterally of other drawer spaces 33 above the partition 32. The space 31 is generally of rectangular cross section and of a depth, as shown, determined by the width of the ironing board 25 and the guiding and supporting means therefor.

Figure 5:
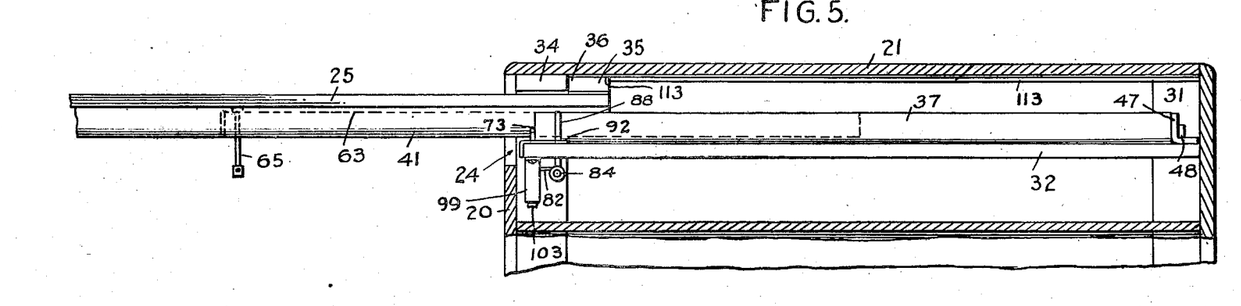
Fig. 5 is a view similar to Fig. 3 with the ironing board withdrawn and braced for service.

Adjacent the open end 24 of the dresser and underneath the top thereof is a brace piece or reinforcing frame member 34 bridging the space 31 and supporting the top 21. This bridge piece, quite usually being of squared cross section, is functionally taken advantage of in the present instance for, as will be seen (for example Fig. 5), the ironing board has upwardly extended stops 35 on the upper surface of the ironing board and rigidly secured thereto, the forward ends 36 of the same constituting square shoulders or abutments to contact the corresponding adjacent face of the bridge piece 34 when the ironing board is withdrawn to the full limit of its movement.

When the ironing board is withdrawn or projected from its nesting place in the top of the dresser, it is quite desirable that some under structure be provided to assist in bracing or supporting the board under the forces and strains encountered in its operation, rather than rely on the mere engagement of the brace-piece or board with the dresser structure. Therefore, and preferably, a novel and efficient mechanism is furnished to automatically follow-up the propelling or projecting function of the ironing board, and support the board at any desirable points within the length thereof, so that the same will have abundant strength and stability to bear the weight of the ironing operation and attendant strains on the board.

Both the ironing board and the under-support thereof are automatically projectable, that is, they are adapted to be thrust outwardly from the interior of the dresser structure into position for mutual cooperation and effective ironing arrangement; it being intended that the ironing board proper be projected in advance of its supporting brace and that the latter be projected only to the extent desired or needed in the particular ironing operation encountered.

The projecting means for the ironing board, and for the underbracing structure thereof comprises, in most instances, spring mechanism, adapted to be compressed to store-up power when the ironing board is in its nested or closed position and to be released after opening the door or panel 26 at the end of the storage chamber or space, upon freeing the same from locking means, as hereinafter set forth.

There is a pair of the projecting or propelling devices in parallel relationship, spaced apart, each comprising an elongated cylindrical metal guide 37 open at its upper edge 38 and having a flat base portion, secured by screw fasteners 39, engaging threaded sleeves or nuts 40, in the partition 32. This cylindrical or tubular guide 37 is fashioned to receive and have telescopic engagement with a complemental tubular metallic guide 41 adapted to slide back-and-forth within the tubular member 37, a guiding strip 42 along the upper central edge of this tubular guide 41 working back-and-forth in the space 38 at the top of the guide member 37. Relative rotary movement of the telescoping tubes is thus prevented. The guiding strip 42 is preferably integral with, but may be formed separately from the tubular guide members, and the structure is fastened to the ironing board 25 by screws 43 passed through such openings as 44, in the tube and throughout the strips 42 into fastening engagement with the ironing board 25.

45 is a coiled spring extending, when expanded, the full length of the combined tubes 37 and 41 in their extended relationship, abutting at a closely coiled and strong end 46 thereof the upright portion of the angular fixed plate 47, the horizontal portion of the plate being bolted as at 48 to the partition 32, the head of the bolt being elongated vertically and stocky and strong to back up the angular plate and resist blows or shocks when the board is forced home in the nesting operation. The tubes are, of course, prevented from separation when the ironing board is fully extended because of the stop 35 engaging the cooperating part 34 of the cabinet.

There is also a sleeve 50 surrounding the inner end of the coiled spring 45, the inner end of the sleeve being fixed so that the tubular guide member 41 will slide thereover by having its inner end offset as at 51 downwardly behind the end of the fixed tube 37, also fixed in place by the screws 52 and 39 to the partition 32.

The outer end of the spring 45 has also close parallel convolutions 53 bearing on the under face of the flanged closure plug 54, held by a pin or the like 55 passing through the same and through the adjoining end of the tube 41. The plug with its flange presents a finished, smooth, flat front.

Figure 1:
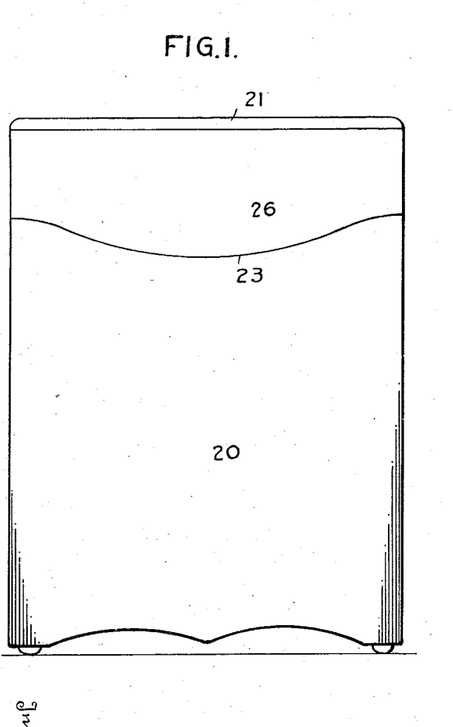
Figure 1 is an end elevation of what is commonly styled a chest of drawers provided in the top thereof with a space in which is mounted the housed and withdrawable ironing board feature of the combination.
Figure 2:
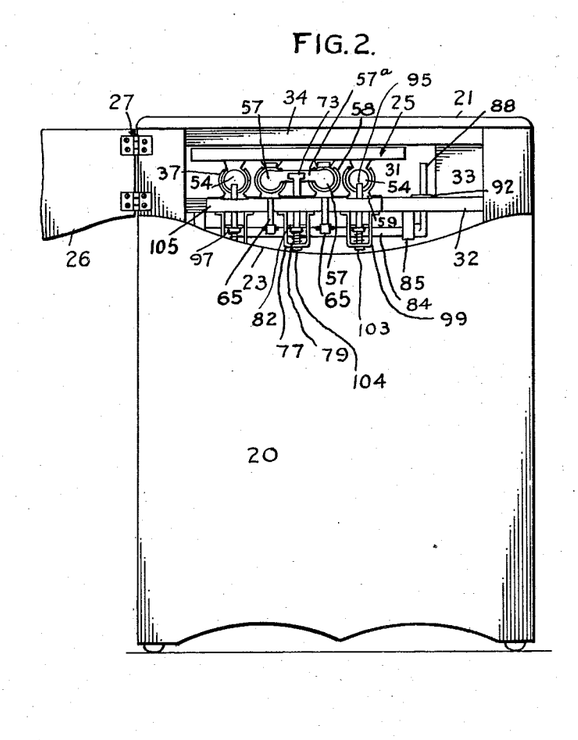
Fig. 2 is a similar view with a hinged panel or end closure thrown back in opened position and exhibiting the end of the ironing board appurtenance.

Referring to Fig. 2 of the drawings, it is to be noted that the foregoing description of the projecting or propelling means for the ironing board applies to the two outside members of the series of four generally similar devices.

Figure 6:
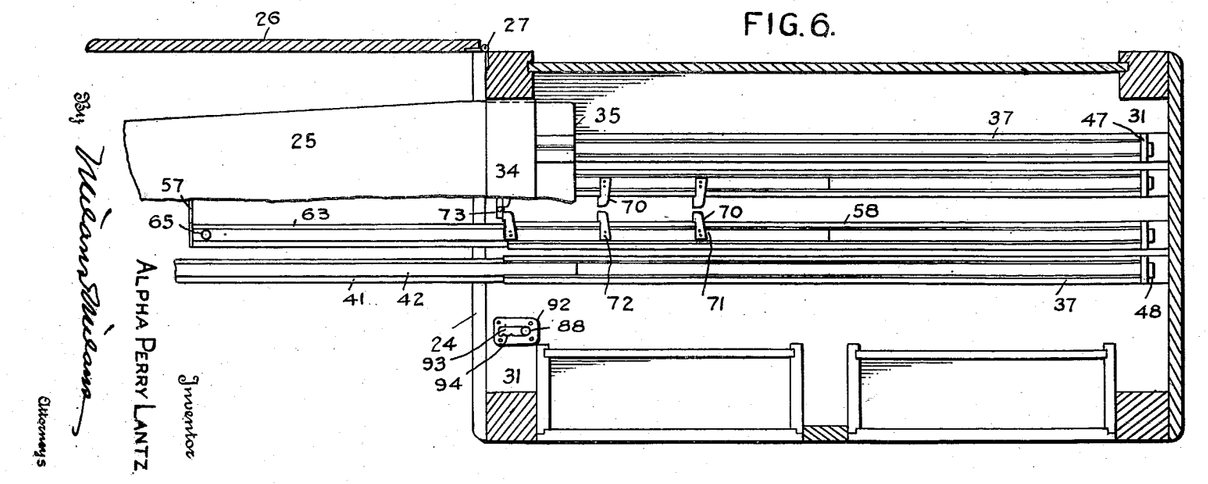
Fig. 6 is a horizontal sectional view similar to Fig. 4, showing the board in projected position and broken away to expose the underlying structure.
Figure 9:
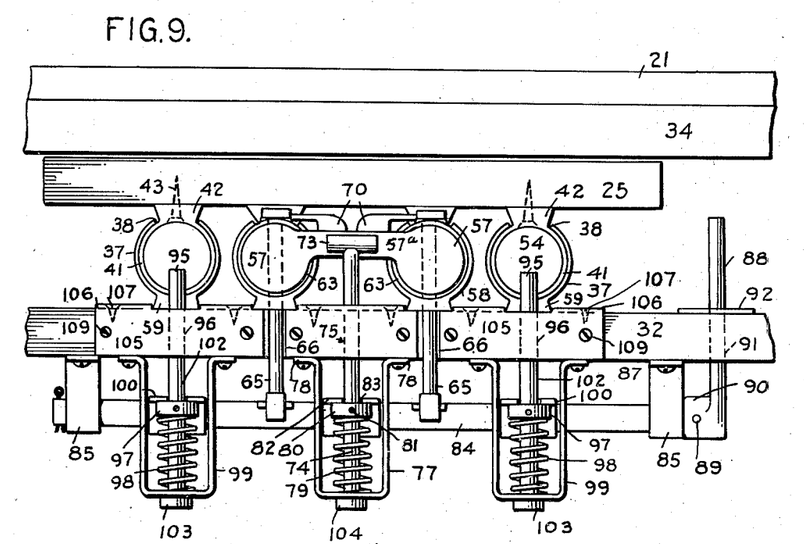
Fig. 9 is an end view showing particularly the means for locking the brace or support for the ironing board in a predetermined projected position of the brace, also for locking the entire combination of board and brace in closed position.

Now, referring to the two intermediate devices, which are the adjustable braces to be projected underneath the board, when the latter is projected, to reinforce the same:

Disposed in parallel relation to the ironing board propelling devices, and, as stated, in a pair located therebetween, are similar propelling devices for an under-support or brace for the ironing board, each comprising a hollow or tubular formation 56, and rigidly connected together at their outer ends by a head portion 57 (Fig. 9). These brace or support members 56 are telescoped with cooperating tubular guide members 58 having flat base portions 59 and secured to the partition member 32 similarly to the fastening of the tubular guides 37 previously defined. A confining sleeve 60, for each spring 61, is employed in the present instance, the spring operating, when the parts are unfastened, to propel or thrust the under-brace or support for the ironing board into supporting relationship therewith, when the latter is projected as illustrated, for example, in Figs. 5 and 6. The combination is substantially the same in other respects as in the propelling structures for the ironing board heretofore defined, it being understood that the offset end portion of the sleeve 60 is arranged to project downwardly against the tubular construction 58 to prevent longitudinal movement of the sleeve.

The inner ends of the propelling springs are anchored with reference to the tubular supporting or brace member 63 by looping or hooking the terminal of the spring around a hook 68 struck inwardly from the vertical flange 69 otherwise shaped and secured in place the same as the angle plate 47, previously described.

Figure 8:
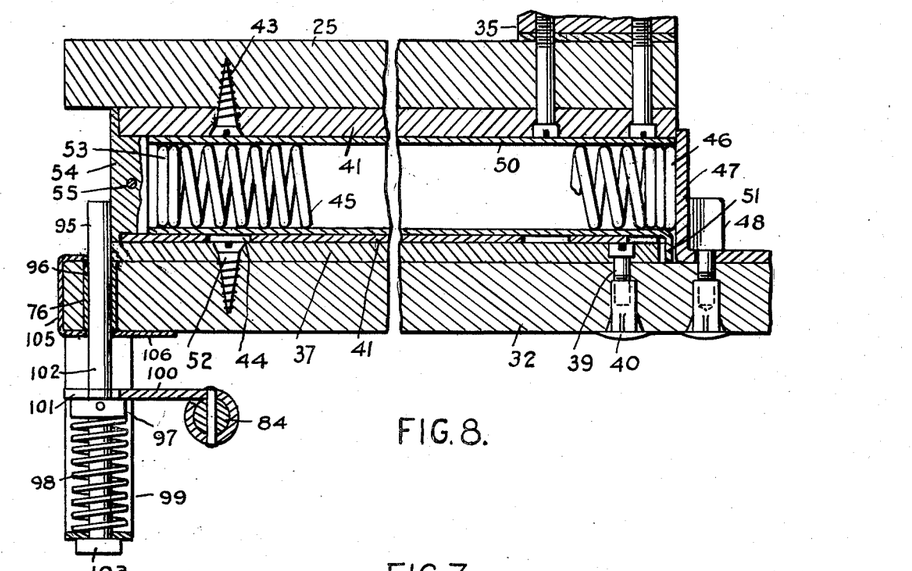
Fig. 8 is a similar view of one of the propelling devices for the ironing board.

It will be understood that in assembling the structure the connected head portion 57 may be welded or similarly united to afford the integral structure with the tubular brace or supporting member 63, a securing pin 64 being shown, by way of illustration herein, the same as the pin construction 55 of Fig. 8 heretofore described.

Figure 7:
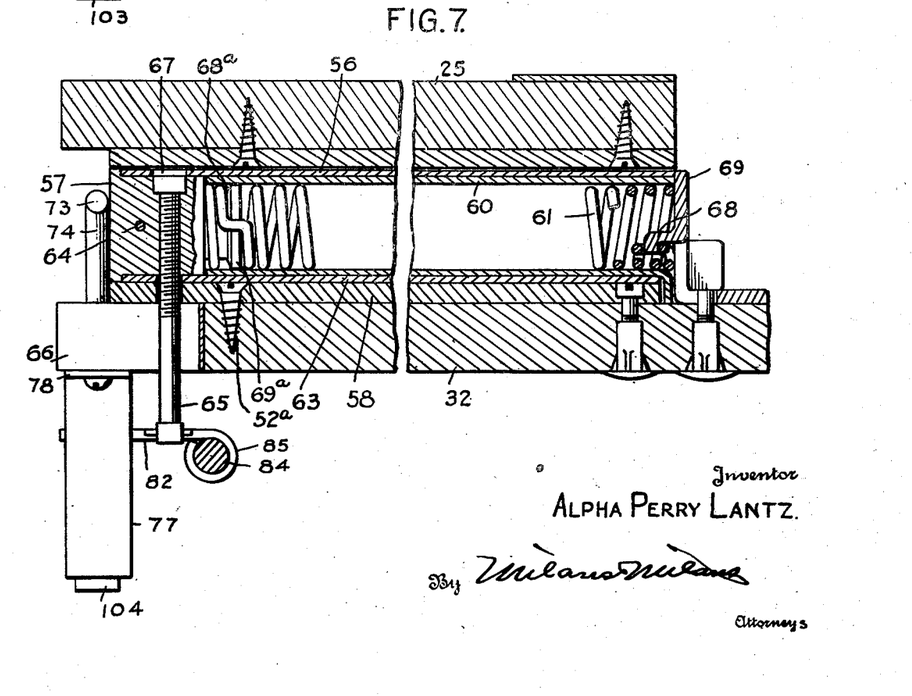
Fig. 7 is a horizontal sectional view through one of the bracing or supporting means for the ironing board.

As seen in Figs. 7 and 9, adjustable jacks 65, are threaded through the end portions or plugs 57 of the supporting or brace structure, provided and designed for leveling the surface of the ironing board as may be found necessary. These jacks normally depend through a recessed portion 66 in the forward edge of the partition member 32 and are adapted to be projected through openings 67 in the brace members 63.

Figure 3:
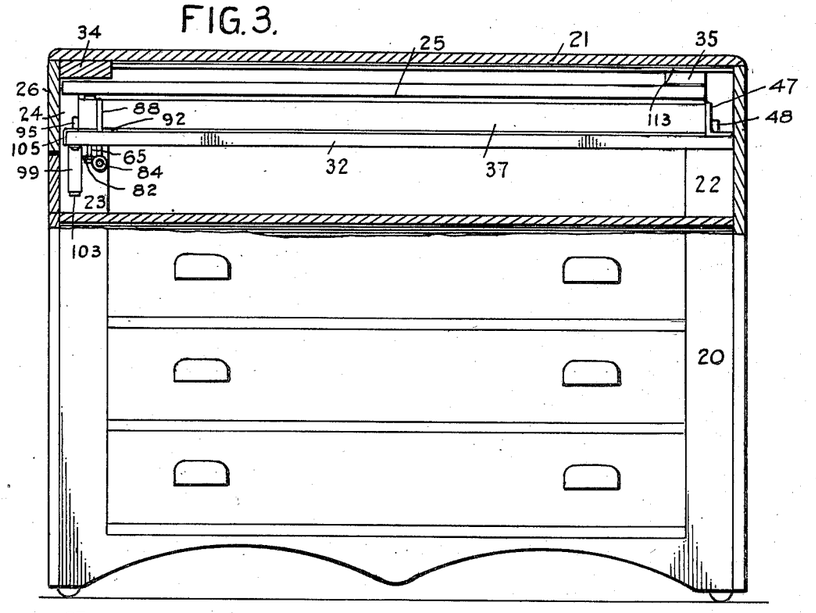
Fig. 3 is a face view of the article of furniture shown in Figs. 1 and 2, with portions broken away to enable showing of the ironing board structure.

All of the foregoing devices lie well within the plane of the end of the structure so as not to interfere with the closure panel or door 26 when the ironing board is in inactive or stored position (Fig. 3).

Inwardly beyond the jacks the plugs 57 are formed into spool-like extensions 68a having a peripherally notched flange 69a, through which the adjacent terminal of the spring 61 may be passed and given a couple of turns around the spool to adequately fasten the spring to the plug and brace member 63.

The strength and expansibility of the propelling springs 45, of the ironing board, are adequate to thrust the ironing board outwardly to its full extent, when the door 26 of the casing is opened and the board is not otherwise locked in place, as hereinafter set forth; and the springs 61 of the brace members possess a capability of automatically throwing the brace to near the maximum extent of projection of the board, but it is the intention, and a part of the underlying spirit of the invention, to have the brace members under ready control so as to limit their projection beneath the board to various degrees and correspondingly brace the board more-or-less rigidly in keeping with the work to be done, it being observed that if the ironing is such as can be performed at the inner end of the board and the brace is simply projected to underlie that portion of the board, the structure is somewhat more stable or rigid than if the brace is extended farther outwardly, when there would be correspondingly less anchorage in the casing. It is observed, however, that there is abundant strength and anchorage at all times to meet usual conditions, provision being made for the tieing down of the guiding members 37 and 58 by the clamping thereof entirely through the partition 32, whereas, the use of screws 52, as in Fig. 8, and screws 52a, as in Fig. 7, are there sufficient because there is no lifting force or tendency at the outer end of the board such as exists at the inner or tail end thereof, when weight and ironing pressure is applied to the projected portion of the board.

Below the bottom surface of the ironing board 25, arranged in a series longitudinally thereof and in mid-position between the propelling devices for the under-support or bracing structure, I provide oppositely disposed detents 70 secured at 71 to the projectable brace members 41, as indicated at 72, as by riveting or otherwise, as desired. In the path of movement of these detents, forwardly as the braces are projected, there is a relatively fixed T-headed stop member 73 supported near the outer edge of the partition 32, the purpose of this T-headed stop being to thrust itself in advance of any pair of the detents 70 to correspondingly stop the movement of the ironing board brace outwardly beneath the said board. The T-headed stop 73 has a stem 74 passing freely through a smooth opening 75 in the partition 32 so that it will be guided in its up and down movement into and out of the plane of the detents 70 in stopping or permitting the same, together with the ironing board brace, to pass thereover. The opening 75, constituting the bearing for the shaft 74, as will instantly be appreciated, may be suitably lined by a metal sleeve or the like if found desirable and this suggestion of metallic tubular linings will apply to other features where reciprocating movements with ease and facility are designed, as for example, the sleeve or ferrule 76 illustrated in Fig. 8, some of which obvious detail illustrations are conveniently omitted.

Beneath the partition 32, in operative alignment with the T-headed stop just described, is a stirrup 77 of U-shape formation having flanges 78 secured by bolts, screws or the like to the underside of the partition 32, the bend of the yoke constituting a bearing for the lower end of an expansion spring 79, exerting a thrust at its upper end against a collar 80, fixed to the shaft 74 by a pin 81 or otherwise fastened against movement on the shaft. The upward limit of movement of the T-headed stop 73 under the pressure of the spring, just referred to, is determined by a control arm 82 having a slotted end 83 for the reception of the stem 74 of the stop 73. The inner end of the control arm is turned around and keyed or welded to a control shaft 84 so that it will be actuated in keeping with the rotation of said shaft. The shaft is arranged transversely to the direction of movement of the ironing board and its brace, or braces, by having the ends of the shaft rotatively received in bearings 85 near the opposite ends of the shaft, said bearings being of strap formation encompassing the shaft and then closed together at opposite end portions 86 and held in place by offset flanges 87, secured by screws, bolts or the equivalent to the partition 32.

Figure 4:
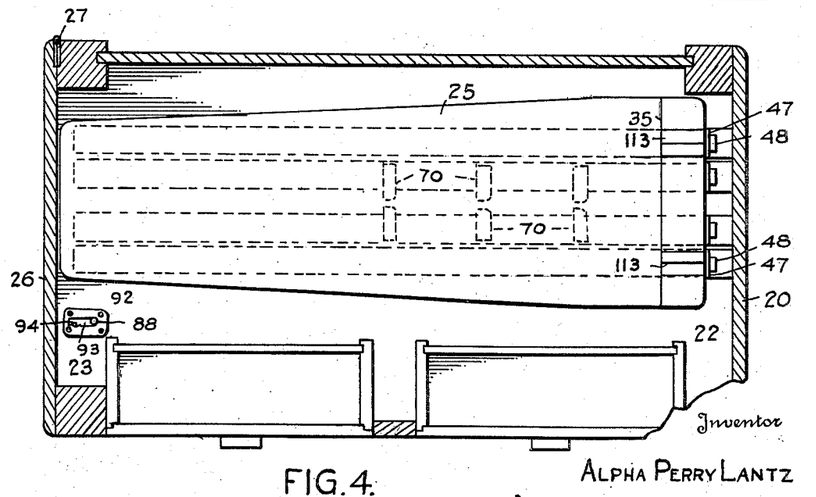
Fig. 4 is a top view of the ironing board and associated structure, the upper portion of the chest being in section to expose the board.

The actuation of the shaft 84 is accomplished by manipulation of a lever 88 rigidly secured to the shaft by a pin 89 passing through a cupped portion 90 of the receiving end of the shaft. The lever passes upwardly, as at 91, through the partition 32 (Figs. 4 and 9) and through a superimposed plate 92 on the partition, the latter and plate being provided with registering elongated slotted portions 93, notched if desired, as at 94 to engage and hold the lever 88 in its positions of adjustment.

Normally the spring holds the T-headed stop 73 in the position indicated in Fig. 9 with the lever 88 at the limit of its rear movement (Fig. 12) and with the T-head in the path of movement outwardly of the connecting member 57a of the end or closure caps 57. This locks the brace members for the ironing board in nested or closed position when not in use. When desired for use, on pressing of the lever 88 forwardly from the position shown in Fig. 12, the shaft 84 will be correspondingly rotated and the actuating arm 82 rocked downwardly, correspondingly lowering the shaft and T-head against the pressure of the spring 79 which will permit the head to occupy a position lower than said connecting portion 57a, leaving the springs 61 free to act in thrusting the brace members for the board outwardly. Dependent upon the work to be done and the degree of supporting or bracing the board, the T-head will be held downwardly and out of the path of movement of the detents 70 until the braces are at the desired position, when the hold on the actuating lever 88 will be released and the stop 73 permitted to rise in the path of movement of the pair of detents intended to be engaged, when the braces will be stopped in their movement outwardly. If further movement outwardly is desired all that is necessary is to actuate the lever 88 to release the detents already engaged and permit them to pass on outwardly with the brace until some succeeding pair of detents are to be encountered by again releasing the hold on the lever 88 and permitting the T-headed stop or abutment to be pressed upwardly by its spring 79.

Now, the function of the stop mechanism thus far defined in holding the bracing means in nested or closed position and cooperating with the detents 70 to obtain the variable degree of extension of the bracing means relative to the board, having been outlined, it remains to point out the means provided for similarly holding the ironing board in nested or closed position. Having in mind that the ends of the propelling tubes 41, of the board 25, have also been described as having closures 54, it will be appreciated that stop means engaging therewith, similar to the stop means to hold the braces in closed position, may be utilized. Generally the mechanism is the same and comprises stops 95 mounted to work vertically through suitable openings 96 in the partition 32 and provided with fixed collars 97 thereon, expansion springs 98 below the collars and stirrups 99, like the stirrups 77, previously described, operating in the same manner as already understood, through the medium of control arms 100 slotted at 101 at their outer ends to receive the shanks 102 of the stops 95 and bearing upon the collars 97, the inner ends of the control arms 100 being keyed to the shaft 84 or otherwise made fast thereto as in the case of the control arm 82. The lower ends of the stop shafts 102 and 74, that pass through the bottom portions of the stirrups 99 and 77, are headed as at 103 and 104 to function as devices positively preventing excessive upward movement, dislocation, etc. of the stops with reference to the stirrups and stirrup springs, etc.

To prevent possible confusion in an understanding of the operation of the device it is reiterated that the propelling means for the ironing board thrusts the same outwardly to its maximum extent immediately upon withdrawal of the stops 95 from in front of the cap or closure members 54, and it is only in the instance of the brace members for the board that provision is made to utilize stop mechanism to position the brace at different places underneath the board. Preferably, therefore, it is intended, and the proportions and relation of parts are such, that in the initial movement of the actuating lever 88 the stops 95 for said propelling means of the board—and coincidentally the stops for the board itself—will first release the propelling means for the board incident to such stops being depressed to a level therebelow; and then upon continued movement of the lever 88 the T-headed stop 73 will initially pass downwardly from engagement with the connecting member 57a of the bracing mechanism, thereby releasing the latter for outward thrust under the pressure of its springs, so that the braces may be automatically propelled or projected outwardly until it is desired to stop the same, when the holding pressure on the lever 88 may be released to permit the spring 79 to throw the T-head stop upwardly into the path of the oncoming pair of detents 70, when the movement of the bracing means will be stopped, as previously pointed out, and the degree of support or brace of the ironing board thereby regulated to meet conditions of service as thought expedient or necessary.

The shafts or shanks 74 and 102 have been suggested as passing through openings in the partition 32, which openings may be either an integral part of the partition or may be smooth-lined by metal tubing or ferrules, in any mechanical fashion, to afford good working bearings. As illustrated, the openings for the shafts are provided in the nature of an inverted U-shaped metal plate 105 set in the edge of the partition 32 and secured thereto by top and bottom flanges 106, fastened to the partition as at 107. Guide sleeves or tubes 76, with rounded hollow riveted ends or welded in the member 105 furnish the immediate bearing for the stop shafts 102 or 74. Other screw fastenings 109 may engage the terminals or unbent ends of the member 105 with the edge of the partition 32 at points beyond the intermediate guided portions, the latter being seated in corresponding cut-out portions in the edge of the partition. This will afford a very strong mounting for the stops and desirable reinforcing or strengthening of the partition 32 at the edge thereof, particularly when formed of wood, and subject to cracking or damage in strenuous use.

Figure 12:
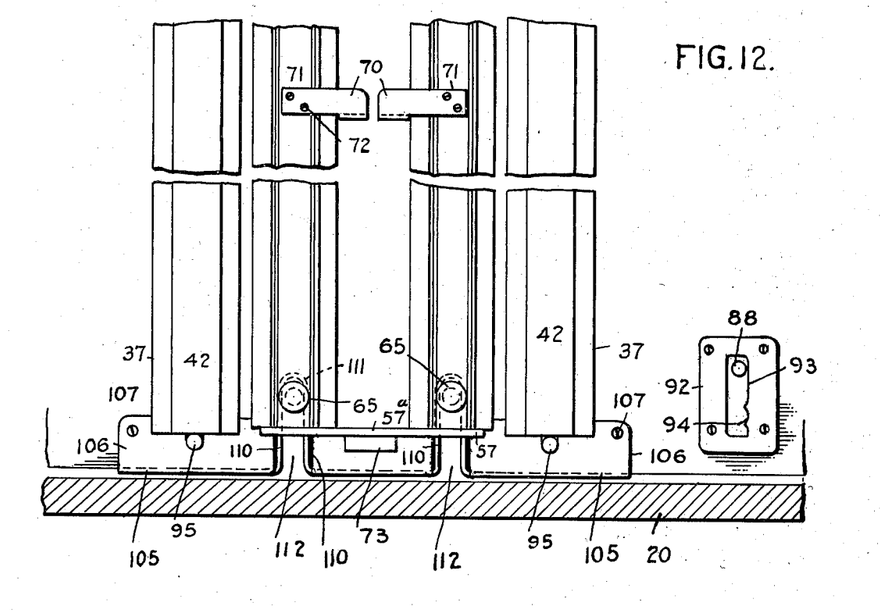
Fig. 12 is a top view thereof, the board not being shown.
Figure 13:
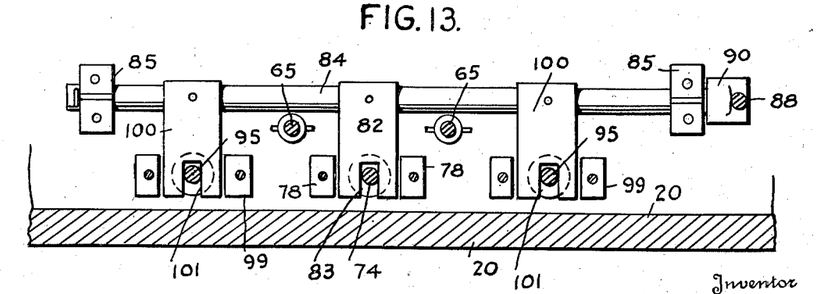
Fig. 13 is a similar top view of the stop actuating means.

Another detail of the plate 105 is to be noted and that is, as will be apparent upon an inspection of Fig. 12, the flange portions 110 thereof are bent inwardly and form loops 111 affording a smooth metal way 112 into and out of which the jack screws 65 pass with the braces as the latter are projected outwardly and retracted into nested relationship in the casing.

Figures 10, 11, 24:
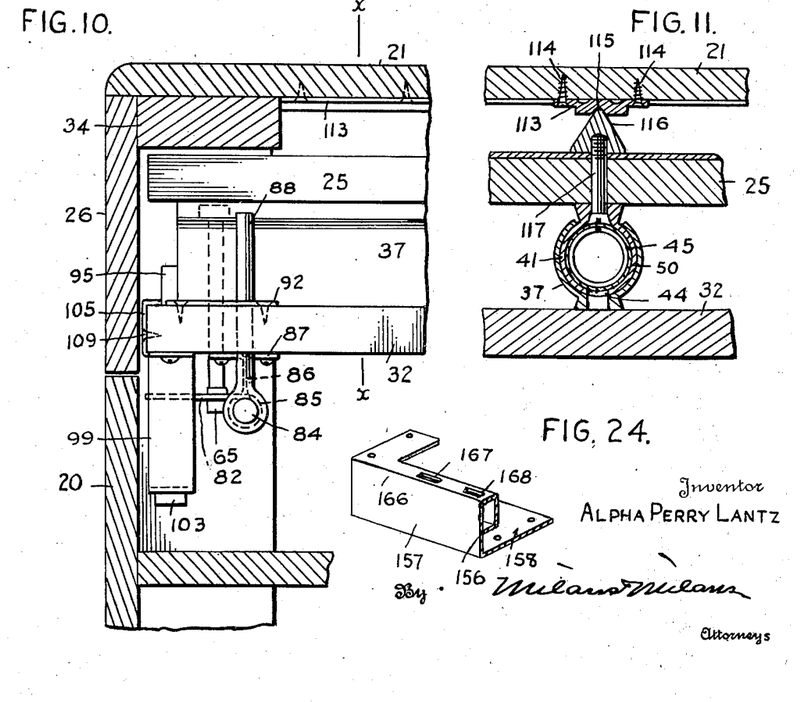
Fig. 10 is a side view from the right of Fig. 9.
Fig. 11 is a fragmentary sectional view on the line X—X of Fig. 10.
Fig. 24 is a detail perspective view of a detached part of one of the stop mechanisms.

In some instances it may be desirable to form additional rectilineal guides for the board to overcome any tendency to shift edgewise and bind the tubular projecting or propelling structure, and with that in mind the top of the cabinet or casing 21 has secured on its under surface a metallic runway 113, disposed longitudinally thereof and attached thereto by screws 114, the same having a groove 115 adapted to receive the complemental rib or guiding member 116, of triangular form in cross-section to afford a broad, flat rest on the upper surface of the ironing board 25, the guiding member 116 being firmly secured in place conveniently by attaching bolts or screws 117 serving also as part of the securing means for the tubular members 41 of the propelling means for the board. This construction is best illustrated in Fig. 11 and generally indicated in some of the other figures, notably Figs. 3, 5 and 9.

From the disclosures already made, it will be apparent that somewhat modified means may be resorted to in providing stop mechanism to normally confine the board and its propelling means in closed position within the cabinet or casing with which the same is combined and for stopping the projection of the ironing board brace at various points, as suggested. Illustrations of two such embodiments of the invention, are presented in Figs. 14 to 20 inclusive of the drawings and these will be now described.

Figure 14:
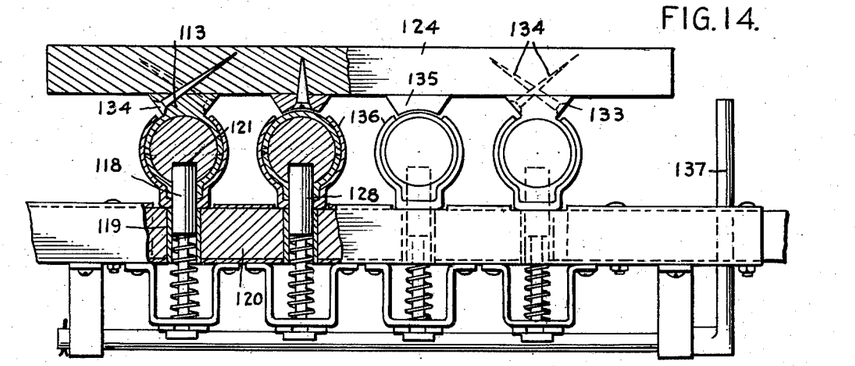
Fig. 14 is an end view, partly in section, of another embodiment of the invention possessing a different type of stop mechanism.
Figure 15:
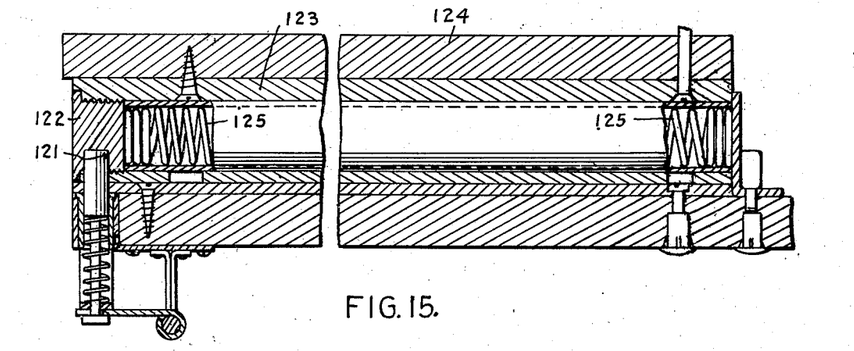
Fig. 15 is a longitudinal section through one of the board propelling devices of the embodiment of Fig. 14.
Figure 16:
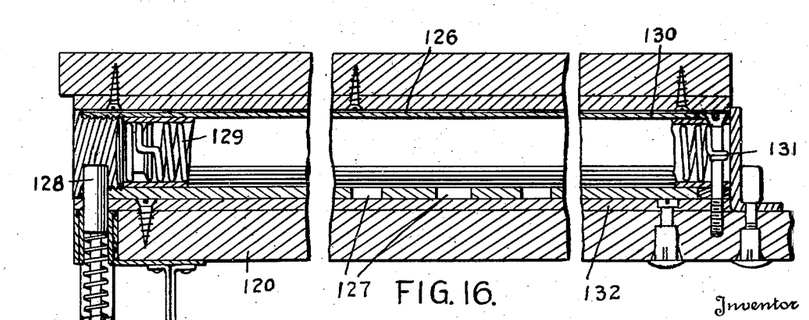
Fig. 16 is a like view of one of the adjustable brace constructions thereof.
Figure 17:
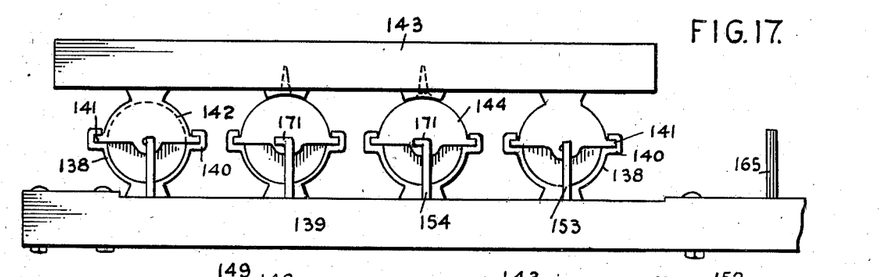
Fig. 17 is an end view illustrating still another embodiment of the invention presenting stop mechanism to prevent the outward advance of the brace member of the ironing board, relative to the latter, as desired, the supports and braces in this form being in semi-tubular sections interfitted along their meeting edges.
Figure 18:
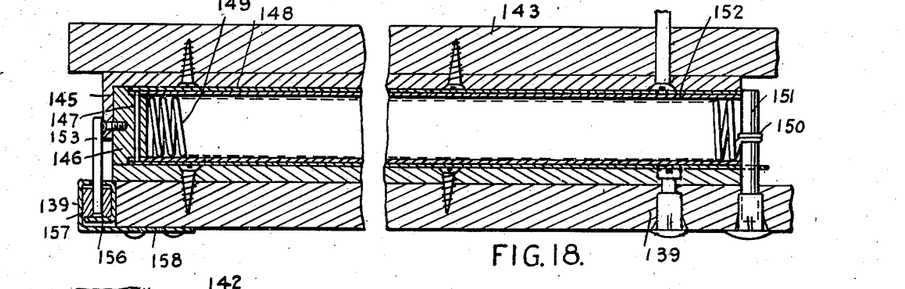
Fig. 18 is a longitudinal section of one of the board propelling devices.
Figure 19:
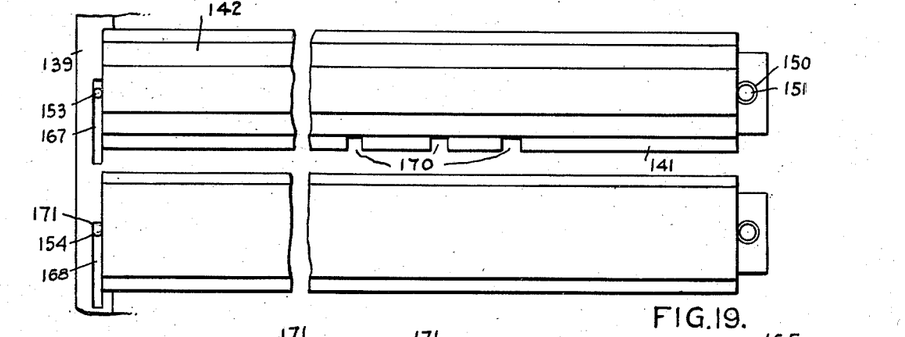
Fig. 19 is a top view looking down on one of the bracing devices and an adjoining outside board propelling device.
Figure 20:
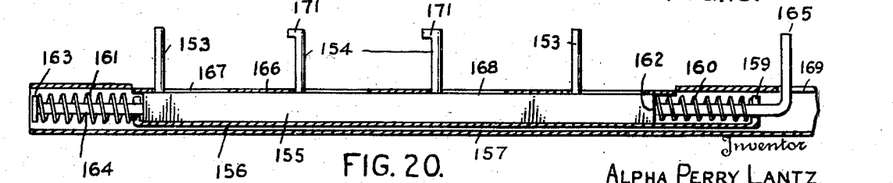
Fig. 20 is a detail view of the stop mechanism of Fig. 17.

First, with reference to the embodiment illustrated in Figs. 14 to 16 inclusive, it will be seen that the general assembly of the parts, and the character thereof, are about the same as considered in connection with the preferred embodiment of the invention shown in Fig. 9 and its related figures, the outstanding difference being in the spring-pressed locks, in the nature of plungers 118 working through cylindrical linings 119 in the partition 120 and engaging recesses 121, in the caps or closure members 122 for the propelling sleeve or tube 123, secured to the ironing board 124. When the board and its projecting tube 123 are forced inwardly home, against the pressure of the propelling spring 125, the spring-pressed plunger or lock 118 will be in registration with the recess 121 and their engagement will prevent the spring from acting to force the board outwardly, as readily appreciated from Fig. 15.

In Fig. 16 practically a double lock mechanism is provided for the brace 126 of the board, the tube in this instance having the series of recesses 127, along its bottom portion to be engaged by the plunger 128 dependent upon where it is desired the brace may be stopped in its projecting movement under the action of its spring 129 to properly position the same under the board 124. The controlling or operating device for retracting the plunger stops 118 and 128 is the same as hereinbefore described and needs no repetition of the description here. The manner of securing the springs 125 and 129, and the formation thereof, is the same as heretofore referred to in connection with the springs 45 and 61 of Figs. 7 and 8, there being one variation however, namely, as shown in Figs. 16, the fastening of the inner end of the sleeve 130 (corresponding to the sleeve 60) comprising a bolt passed through the tube or sleeve 130, and a wound portion 131 of the spring 129, through the fixed guide tube 132 into the partition 120. This anchors these parts in position, it being observed that there is no attachment between this bolt and the projectable sleeve or brace 126 for the ironing board so that the same is free to be propelled outwardly when forming a support or brace for the board.

The members 133, of the inner or projectable tubes of the ironing board, may be secured to the board as previously observed or, as a matter of convenience in attachment, pins or screws 134 may be passed therethrough into the board in diagonally-crossing relationship (Fig. 14). Filler strips 135, on the bottom of the board and above the braces occupying the space between the upper surface of the braces and the board to prevent undue play of the braces in a vertical direction and to cover up the slot or opening in the top of the guide tubes 136 when the braces are projected therefrom, so as to eliminate any possibility of the spring bulging outwardly in any instance where confining tubes, such as the confining tube 60 or 130, are not utilized. In the form of the invention just described the control lever for the locking plungers 118, equivalent to the control lever 88 of Fig. 9, is indicated at 137.

In the other embodiment of the invention (Figs. 17 to 20 inclusive) the guide members 138, secured to the partition 139, are in the nature of semi-cylindrical or half-tubes having their opposite edges 140 shaped to constitute runways in which complemental flanges 141 on the opposite half-tube members 142, carried by the ironing board 143, work in projecting or retracting said board. The ends of the half cylindrical members 142 and corresponding members 144 of the ironing board braces are closed, as shown at 145, and carry caps 146 secured by pins 147 to the projectable tube part 148, the caps 146 abutting the outer ends of the ejecting spring 149, the other end of the spring terminating in coils 150 wound upon a holding pin 151 as heretofore suggested, the pin 151, as previously stated, being sleeved through the spring confining sleeve 152 to hold said sleeve against longitudinal movement as the tube part 148 moves back and forth.

The sleeves 148 and 152 (Fig. 18) are telescoped so that the one (148) will slide back-and-forth over the other (152) when the half-tube 142 or 144, as the case may be, moves out of the casing in projecting or bracing the ironing board. At such time, if the telescoping tubes 148 and 152 were not present, the propelling spring would be exposed laterally of the half-tubes and could possibly spring or bulge out of place. However, the telescoping tubes, one fixed to stay in the casing and the other traveling with the board or brace, will close the otherwise open sides of the half-tubes around the spring and confine and hold the latter in place at all times.

153 are pins projecting upwardly from a lock mechanism and 154 are a pair of detents arranged between said pins, the detents and pins being slidable with a reciprocating bar 155. The bar 155 is slidable longitudinally upon a flange 156, formed as a part of a housing 157, secured by a flange 158 to the outer end of the partition 139 (best seen in Fig. 18), the flange 156 having upturned ends 159 constituting abutments for one end of springs 160 and 161, the former pressing against the end 162 of the slidable bar 157 and the latter against the headed end 163 of the control shaft 164, which is rigidly connected to and carries the pins 153 and detents 154. To permit movement of the pins and detents, as the bar 155 is moved in one direction by the operating handle 165, against the pressure of the springs 160 and 161, and in the opposite direction by action of said springs, the top wall 166 of the housing is slotted as at 167 and 168, having a similar slot 169 for the control handle 165. The detents 154 are adapted to be thrust into notches 170 in one of the flanges 141 of the projectable or upper half of the brace member that underlies the board, so that the brace member will be locked in position at the various places permitted by said notches, it being understood that any number of these notches and any disposition or separation of the same desired, may be availed of.

The detents have the offset heads 171 to engage in the notches 170 so that when the bar 155, is shifted longitudinally to carry the pins and detents away from a normal position in front of the ends of the projecting means for the ironing board and brace members (to normally lock them in nested position), the projecting means for the board and the board will be thrust outwardly to ironing position by said propelling means, the pins 153 being held out of contact with the adjacent propelling means, and the offset end 171 riding against the edge of the flange 141 of the brace member until one of the offsets, in the movement of the brace member outwardly, comes into registration with a notch 170, in the flange, when they will interfit and the brace be held in desired position. The pins 153, of course, have no function save locking means adapted to be thrust in the path of the propelling means for the board to prevent movement of the latter, as stated, whereas the headed detents 154 function both as stops to normally prevent the braces from springing out and when sprung to lock the braces in any of a number of adjusted positions.

Figure 21:
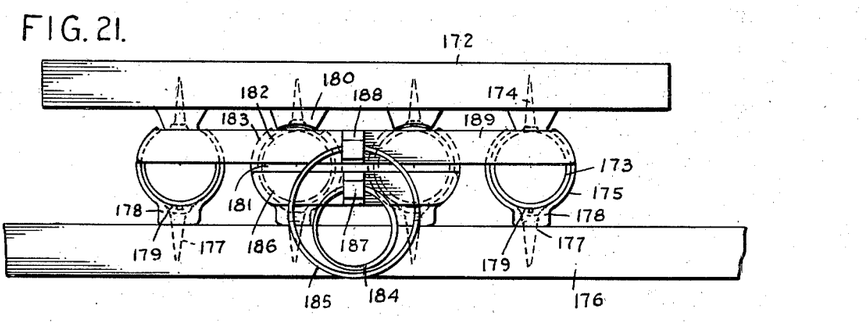
Fig. 21 is an end view of an embodiment of the invention wherein it is not intended to use propelling springs but in lieu thereof manual manipulation only in withdrawing or returning the ironing board and its underbrace or support.
Figure 22:
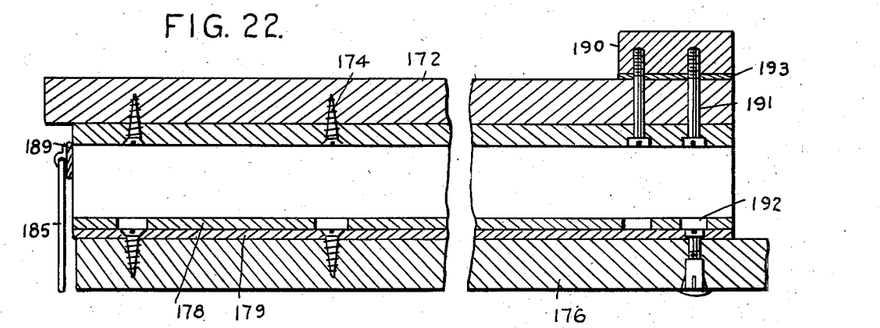
Fig. 22 is a longitudinal section of one of the supporting means for the board.
Figure 23:
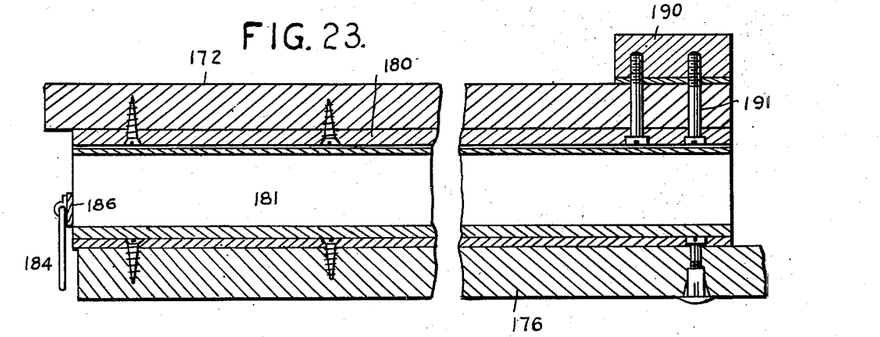
Fig. 23 is a like view of one of the braces.

In that embodiment of the invention illustrated in Figs. 21 to 23 inclusive it will be seen that the ironing board 172 carries the guide tubes 173, secured directly thereto as at 174, as previously taught in connection with the other embodiment first discussed, working in complemental tubular members 175, secured in fixed position to the partition 176, the bottoms of the members 175 being flattened and having the securing screws 177 passing therethrough and into the partition to support and strengthen the same and having openings 179 to accommodate the screws 177. Filler or steadying strips 180 are above the braces 181 and will overcome any tendency of the brace tubes 182 to thrust outwardly through the spaced upper ends of the guides 183. The general arrangement of the parts of this embodiment are as previously explained, the primary difference between the same and the constructions heretofore defined being that this device is extremely simple and serviceable in some instances without any propelling or extension mechanism, resort being had merely to a manual extension or nesting of the board. This purely manual operation is accomplished through the medium of pull rings 184 for the braces and for the board. The ring 184 is pivotally attached to, and hung from, a cross-member 186, as at 187, the cross-member being at the lower half of the tubular braces and welded or otherwise fixedly attached to the ends thereof.

The ring 185 is similarly attached at 188 to a parallel cross member 189 rigidly secured to the ends of the projecting tubes 173 of the ironing board 172, the cross-member 189, however, being free relative to the brace members. Thus the ironing board and its braces may be pulled outwardly by engaging the two rings 184 and 185 simultaneously with the finger or hand of the user, or the board may first be withdrawn and the braces afterwards, or they both may be withdrawn to a certain extent a given distance when the finger or hand may loosen its hold on the ring 187 to stop the outward movement of the brace while permitting the hand to further withdraw the board to a greater distance as is readily understood, the maximum movement being limited or defined by the stops 190, as in all the other embodiments of the invention, similar to the stops 35 on the board 25 first herein described. All of these stops, as illustrated at 35 and 190 are secured to the ironing board proper by bolts 191 passed through openings 192 in the projecting tubes and then through similar openings in the opposite part of the tube and through the ironing board proper into threaded engagement with the stops, a steel or metallic strip being interposed between the stops and ironing board, as at 193, for the purpose of strengthening the board to overcome any tendency to warp, etc.

I claim:

1. The combination with a supporting casing, of an ironing board slidable into and out of the casing, means for propelling the board outwardly, and means normally preventing functioning of the propelling means to retain the board in the casing, said propelling means comprising interfitting members located beneath the board and spring means therein to force the board outwardly.

2. The combination with a supporting casing, of an ironing board slidable into and out of said casing, means for propelling the board out of the casing, a brace adapted to underlie the board parallel therewith when extended, and means for propelling the brace outwardly to said underlying position, said propelling means for the brace comprising interfitting members located beneath the board and spring means therein to force the board outwardly.

3. The combination with a supporting casing, of an ironing board slidable into and out of said casing, means for effecting withdrawal of the board outwardly, a brace underlying the board movable in a plane parallel with the board to underlie the latter when projected, means for mounting the board in place comprising interfitting tubular members located below the board, and the brace also comprising interfitting tubular members, the base portions of the tubular members being flat and formed for reception of fastening devices.

4. The combination with a supporting casing, of an ironing board slidable into and out of said casing, means for propelling the board out of the casing, a brace adapted to underlie the board parallel therewith when extended, means for propelling the brace outwardly to the said underlying position, and means for adjusting the underlying extent of the bracing means relative to the board by correspondingly limiting the action of the brace propelling means.

5. The combination with an ironing board, of a support therefor, means whereby the board may be extended from the support, a brace, spring means exerting a constant tendency to automatically project the brace to underlie the board, and means for determining the extent of projection of the brace relative to the board, said last-mentioned means comprising a relatively fixed abutment and a series of movable spaced detents arranged to cooperate with said abutment to limit the projection of the brace and the action of the automatic projecting means.

6. The combination with an ironing board, of a support therefor, means whereby the board may be extended from the support, a brace, spring means exerting a constant tendency to automatically project the brace to underlie the board, and means for variously limiting the extent of projection of the brace relative to the board under the action of the automatic projecting means.

7. The combination with an ironing board, of a support therefor, means whereby the board may be extended from the support, a brace, spring means exerting a constant tendency to automatically project the brace adapted to underlie the board, and means for determining the extent of the projection of the brace relative to the board, said last-mentioned means comprising an abutment, a series of spaced detents movable with the brace and cooperating with said abutment, and means for releasing an immediate holding detent to permit the brace to be further extended under the action of the automatic projecting means to engage a succeeding detent with the abutment.

8. The combination with a supporting casing, of an ironing board slidable into and out of the same, spring means exerting a constant tendency to propel the board to extended position, a horizontally disposed brace for underlying the board in parallel relation thereto, and successively releasable catches adapted to hold the board and brace in relatively different extents of projection from the casing.

9. The combination with a supporting casing, of a self-propelled ironing board therein adapted to be projected therefrom, a self-propelled brace, means for regulating the extent the brace may underlie the board comprising a relatively fixed abutment, detents movable with the brace adapted to respectively engage the said abutment, said detents normally projecting into the plane of the abutment, and means for shifting the abutment to permit the brace to disengage a detent whereby to automatically engage a succeeding detent upon the greater extension of the brace under the action of the propelling means.

10. The combination with a supporting casing, of an ironing board slidable into and from said casing, a brace also slidable in the casing adapted to underlie the board, and means between the board and brace for leveling the board when supported by said brace.

11. The combination with a supporting casing, of an ironing board slidable into and out of said casing, cooperating tubular members constituting the sliding means for the board, the tubular members having depressed interfitting bottom portions apertured to register when the ironing board is closed, spring means for thrusting the tubular member secured to the board outwardly with the board, and stop means adapted to engage the said apertured portions to lock the board in nested position.

12. The combination with a supporting casing, of an ironing board movable into and out of said casing, a tubular brace having a part movable beneath the board and a part fixed to remain in the casing, for bracing the board when projected, the movable part of the bracing means being provided with laterally disposed detents, and means operatively related to said detents and arranged at the side of said member to lock the same in the position determined by the particular detent engaged.

ALPHA PERRY LANTZ.

REFERENCES CITED

The following references are of record in the file of this patent:

UNITED STATES PATENTS

| Number | Name | Date |
|---|---|---|
| 551,806 | Zierfuss | Dec. 24, 1895 |
| 930,884 | Relinghaus | Aug. 10, 1909 |
| 1,002,900 | Christie | Sept. 12, 1911 |
| 1,134,195 | Heinitz | Apr. 6, 1915 |
| 1,151,505 | Abrashin | Aug. 24, 1915 |
| 1,532,973 | Adelson | Apr. 7, 1925 |
| 1,666,548 | Anderson et al. | Apr. 17, 1928 |
| 2,076,888 | Goodwin | Apr. 13, 1937 |